United States Patent
Son et al.

(10) Patent No.: US 9,041,847 B2
(45) Date of Patent: May 26, 2015

(54) METHOD AND APPARATUS FOR SELF CAMERA SHOOTING

(71) Applicant: Samsung Electronics Co., Ltd, Gyeonggi-do (KR)

(72) Inventors: Ju-Hyoung Son, Gyeonggi-do (KR); Soon-Mi Cho, Gyeonggi-do (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 13/678,350

(22) Filed: Nov. 15, 2012

(65) Prior Publication Data

US 2013/0128091 A1    May 23, 2013

(30) Foreign Application Priority Data

Nov. 17, 2011    (KR) .......................... 10-2011-0120039

(51) Int. Cl.
    H04N 5/222    (2006.01)
    H04N 5/232    (2006.01)
    G03B 17/00    (2006.01)

(52) U.S. Cl.
    CPC ....... *H04N 5/23245* (2013.01); *H04N 5/23293* (2013.01)

(58) Field of Classification Search
    CPC ............ H04N 5/23293; H04N 5/2353; H04N 5/2625; H04N 5/23216
    USPC .................. 348/333.02, 333.11; 396/263–264
    See application file for complete search history.

(56) References Cited

U.S. PATENT DOCUMENTS

| | | | |
|---|---|---|---|
| 2005/0057677 A1* | 3/2005 | Hagiwara et al. ........ | 348/333.01 |
| 2005/0245295 A1 | 11/2005 | Lee et al. | |
| 2008/0084398 A1* | 4/2008 | Ito et al. ........................ | 345/173 |
| 2008/0239104 A1* | 10/2008 | Koh ......................... | 348/240.99 |
| 2010/0020221 A1* | 1/2010 | Tupman et al. .......... | 348/333.01 |
| 2010/0026830 A1* | 2/2010 | Kim ......................... | 348/222.1 |
| 2010/0245287 A1* | 9/2010 | Thorn ........................ | 345/175 |
| 2011/0128397 A1* | 6/2011 | Kang ........................ | 348/222.1 |
| 2011/0128431 A1* | 6/2011 | Bang ........................ | 348/333.01 |
| 2011/0193809 A1* | 8/2011 | Walley et al. ................ | 345/173 |
| 2012/0081592 A1* | 4/2012 | Lim ........................ | 348/333.04 |
| 2012/0200761 A1 | 8/2012 | Lim et al. | |
| 2012/0242852 A1* | 9/2012 | Hayward et al. ........... | 248/222.1 |

FOREIGN PATENT DOCUMENTS

| | | |
|---|---|---|
| CN | 1694468 A | 11/2005 |
| EP | 2 328 342 A1 | 6/2011 |

(Continued)

OTHER PUBLICATIONS

Office Action dated Jan. 9, 2013 in connection with Korean Patent Application No. 10-2011-0120039.

(Continued)

*Primary Examiner* — Kelly L Jerabek

(57) ABSTRACT

A method enables self-camera shooting in a mobile terminal. In the method, whether a first user input is detected is determined. When the first user input is detected, a half shutter mode is entered. Whether a second user input is detected is determined. When the second user input is detected, self-camera shooting is performed.

28 Claims, 8 Drawing Sheets

(56) References Cited

FOREIGN PATENT DOCUMENTS

| KR | 10-2006-0019401 | | 3/2006 |
| KR | 10-2010-0008936 | | 1/2010 |
| KR | 1020110054770 | A | 5/2011 |
| KR | 1020110088914 | A | 8/2011 |
| KR | 1020110105059 | A | 9/2011 |

OTHER PUBLICATIONS

Notice of Patent Grant dated Sep. 2, 2013 in connection with Korean Patent Application No. 10-2011-0120039.

Translated Chinese Office Action dated Apr. 3, 2015 in connection with Chinese Patent Application No. 201210460138.0; 11 pages.

\* cited by examiner

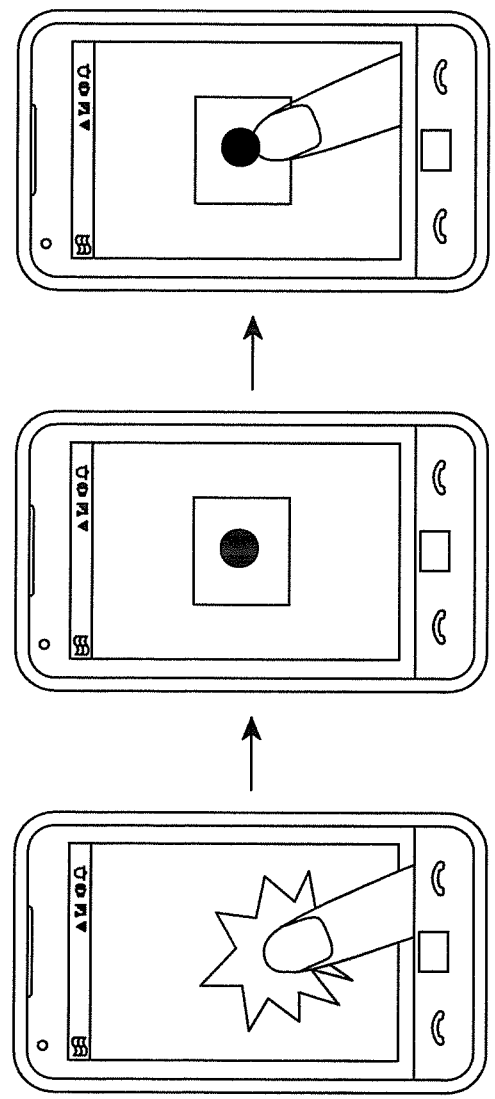

METHOD AND APPARATUS FOR SELF CAMERA SHOOTING

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Nov. 17, 2011 and assigned Serial No. 10-2011-0120039, the entire disclosure of which is hereby incorporated by reference.

TECHNICAL FIELD OF THE INVENTION

The present disclosure relates to self-camera shooting, and specifically, to a method and an apparatus for enabling self-camera shooting.

BACKGROUND OF THE INVENTION

A recent mobile terminal has a camera basically and supports a shooting function using the camera.

When performing shooting, a user performs camera shooting by pressing a key of a mobile terminal or touching a button on a screen.

However, in the example where a user touches a button on a screen during performing shooting, since the user touches the button with his thumb generally, a hand gripping the mobile terminal may shake or the hand's posture may be unstable during the shooting. In addition, this is more serious during self-camera shooting.

In addition, in the example where a user presses a key of the mobile terminal to perform camera shooting, since the key is positioned at a specific position, one of a left-handed user and a right-handed user has an inconvenience.

SUMMARY OF THE INVENTION

To address the above-discussed deficiencies of the prior art, it is a primary object to provide at least the advantages described below. Accordingly, an aspect of the present disclosure is to provide a method and an apparatus for self-camera shooting.

Another aspect of the present disclosure is to provide a method and an apparatus for allowing a user to conveniently perform shooting during self-camera shooting.

Still another aspect of the present disclosure is to provide an apparatus and a method for allowing a user to provide a user input on a screen with a predetermined pattern during self-camera shooting and perform shooting.

Yet another aspect of the present disclosure is to provide an apparatus and a method for allowing a user to provide a user input on a screen with a predetermined pattern during self-camera shooting and perform stable shooting.

Yet further another aspect of the present disclosure is to provide an apparatus and a method for allowing a user to provide a user input on a screen with a pattern defined by the user during self-camera shooting and perform shooting.

Yet still another aspect of the present disclosure is to provide an apparatus and a method for allowing a user to provide a user input on a screen with a pattern defined by the user during self-camera shooting and perform stable shooting.

Yet still further another aspect of the present disclosure is to provide an apparatus and a method for allowing a user to arbitrarily set a position of a popup for shooting during self-camera shooting and conveniently provide a user input for the popup to perform shooting.

In accordance with an aspect of the present disclosure, a method for self-camera shooting in a mobile terminal is provided. The method includes determining whether a first user input is detected, when the first user input is detected, entering a half shutter mode, determining whether a second user input is detected, and when the second user input is detected, performing self-camera shooting.

In accordance with another aspect of the present disclosure, an apparatus of a mobile terminal performing self-camera shooting is provided. The apparatus includes a camera for the self-camera shooting, an input unit for detecting a user input, and a controller for determining whether a first user input is detected, when the first user input is detected, entering a half shutter mode, determining whether a second user input is detected, and when the second user input is detected, performing the self-camera shooting.

Other aspects, advantages and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 2A-C illustrate a user input operation for allowing a user to perform self-camera shooting conveniently and stably in a mobile terminal according to another exemplary embodiment of the present disclosure;

Throughout the drawings, like reference numerals will be understood to refer to like parts, components and structures.

DETAILED DESCRIPTION OF EXEMPLARY EMBODIMENTS

FIGS. 1A through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting, the invention as defined by the appended claims and their equivalents.

More particularly, the present disclosure relates to a method and an apparatus for enabling self-camera shooting via a predetermined user input instead of inputting an exclusive button for self-camera shooting.

Hereinafter, a method and an apparatus for self-camera shooting are described. Though camera shooting denotes self-camera shooting, the present disclosure is applicable to general camera shooting. A user input in the present disclosure includes both a user's touch and a user's input except the user's touch.

Figures 1A, 1B, 1C:
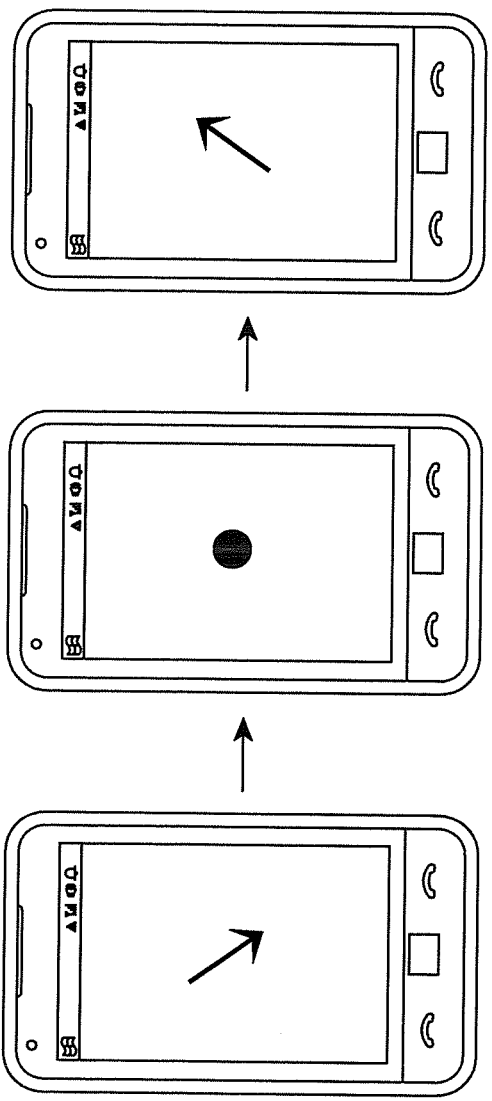
FIGS. 1A-C illustrate a user input operation for allowing a user to perform self-camera shooting conveniently and stably in a mobile terminal according to an exemplary embodiment of the present disclosure.

FIGS. 1A-C illustrate a user input operation for allowing a user to perform self-camera shooting conveniently and stably in a mobile terminal according to an exemplary embodiment of the present disclosure.

Referring to FIGS. 1A-C, a special key for self-camera shooting is not set. Instead, when a specific user input is detected on a preview screen, shooting is performed.

That is, when a user performs a specific motion on a preview screen with his finger, shooting is performed. In FIGS. 1A-C, the specific motion is V. The specific motion in FIGS. 1A-C may be designated by the user. In addition, a user-designated specific motion setting is performed via an exclusive menu provided to the mobile terminal, and the user performs the specific motion on a touch screen of the mobile terminal to set the specific motion.

First, in FIG. 1A, the user takes a posture for self-camera shooting, and provides a user input of a lower diagonal direction in order to input "V" on the screen, that is, the preview screen.

After that, in FIG. 1B, the user sticks his fingers on the screen, that is, the preview screen and stands by for a predetermined time. The predetermined time is for raising accuracy of V input recognition. At this point, the camera enters a half shutter state.

After that, in FIG. 1C, the user performs an input of an upper diagonal direction in order to complete an input "V" on the screen, that is, the preview screen. Then, camera shooting is performed.

FIGS. 2A-C is a second view illustrating a user input operation for allowing a user to perform self-camera shooting conveniently and stably in a mobile terminal according to another exemplary embodiment of the present disclosure.

Referring to FIGS. 2A-C, a special key for self-camera shooting is not set. Instead, when a specific user input is detected on a preview screen, shooting is performed.

In FIGS. 2A-C, when a user provides a user input on the preview screen (FIG. 2A), a popup menu appears (FIG. 2B). The popup menu has a popup. When the user provides a user input to the popup, shooting is performed (FIG. 2C).

That is, the popup may be positioned on a position where a user may provide a user input conveniently.

Figure 3:
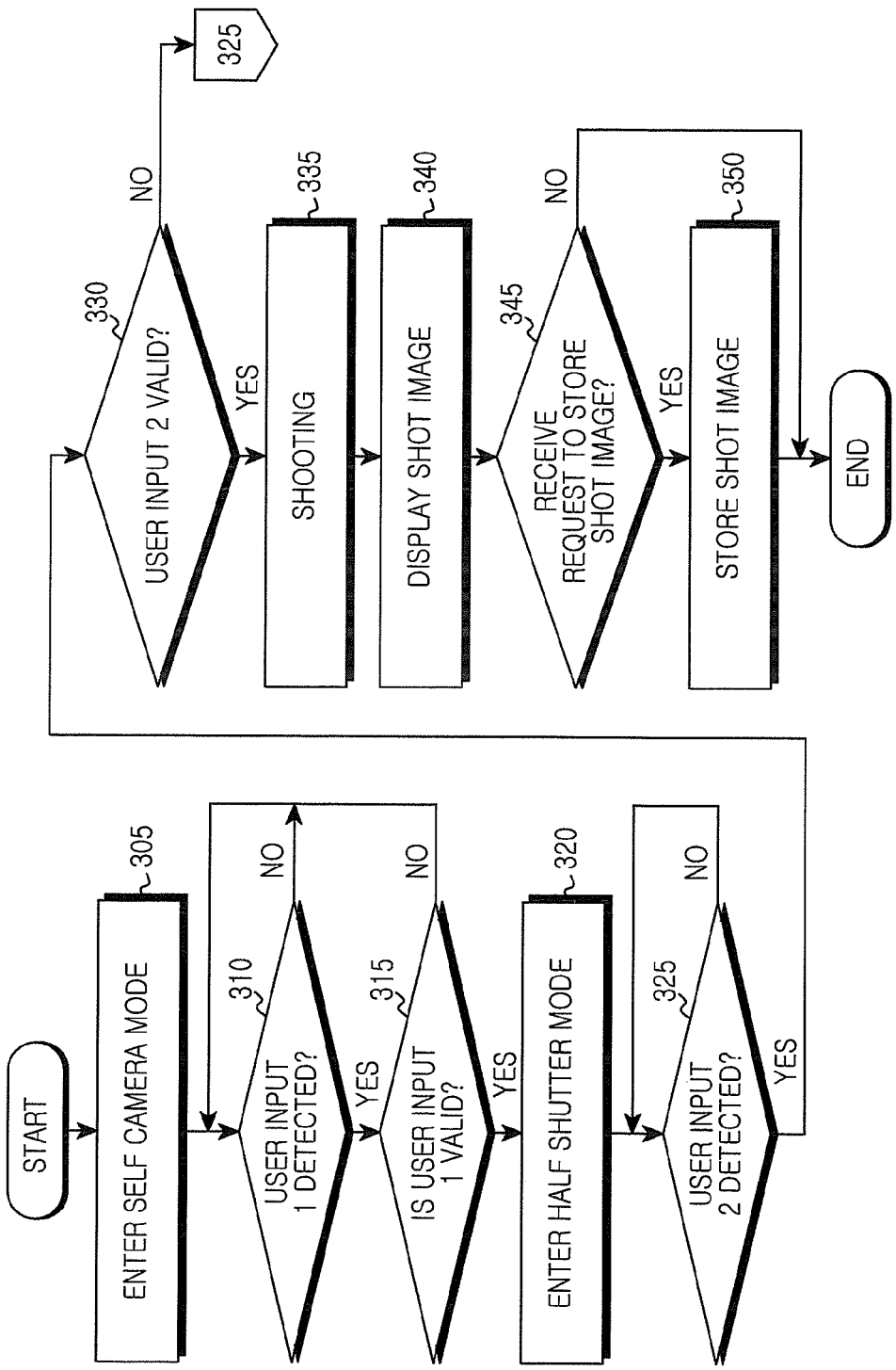
FIG. 3 illustrates a process for allowing a user to perform self-camera shooting conveniently and stably in a mobile terminal according to an exemplary embodiment of the present disclosure.

FIG. 3 illustrates a process for allowing a user to perform self-camera shooting conveniently and stably in a mobile terminal according to an exemplary embodiment of the present disclosure.

Referring to FIG. 3, when the mobile terminal enters a self-camera mode (step 305) and then detects a user input 1 (step 310), the mobile terminal determines validity of the user input 1 (step 315). An example of determining the validity of the user input 1 is described below.

A step of determining whether the user input 1 is valid may denote determining whether the position (ex: x, y coordinates) of a user input and the length of the user input in FIG. 1A are between an upper threshold and a lower threshold, and determining whether the standby time in FIG. 1B is between an upper threshold and a lower threshold. In addition, the upper threshold and the lower threshold may be set by the user in advance or may be a predetermined value. Alternatively, an algorithm for determining the validity of the user input 1 may be a generally used algorithm.

When the user input 1 is valid (step 315), the mobile terminal enters a half shutter mode (step 320).

When the user input 1 is not detected (step 310) and the user input 1 is not valid (step 315), the mobile terminal determines whether the user input 1 is detected again (step 310).

After that, when the mobile terminal detects a user input 2 (step 325), the mobile terminal determines whether the user input 2 is valid (step 330).

A step of determining whether the user input 2 is valid may denote determining whether the position (x, y coordinates) of a user input and the length of the user input in FIG. 1C are between an upper threshold and a lower threshold. In addition, the upper threshold and the lower threshold may be set by the user in advance or may be a predetermined value. Alternatively, an algorithm for determining the validity of the user input 2 may be a generally used algorithm.

When the user input 2 is valid (step 330), the mobile terminal performs shooting (step 335).

When the user input 2 is not detected (step 325) and the user input 2 is not valid (step 330), the mobile terminal determines whether the user input 2 is detected again (step 325).

After that, the mobile terminal displays a shot image (i.e., an image generated by the mobile terminal) (step 340), and when a request to store the shot image is received from the user (step 345), the mobile terminal stores the shot image (step 350).

Figure 4:
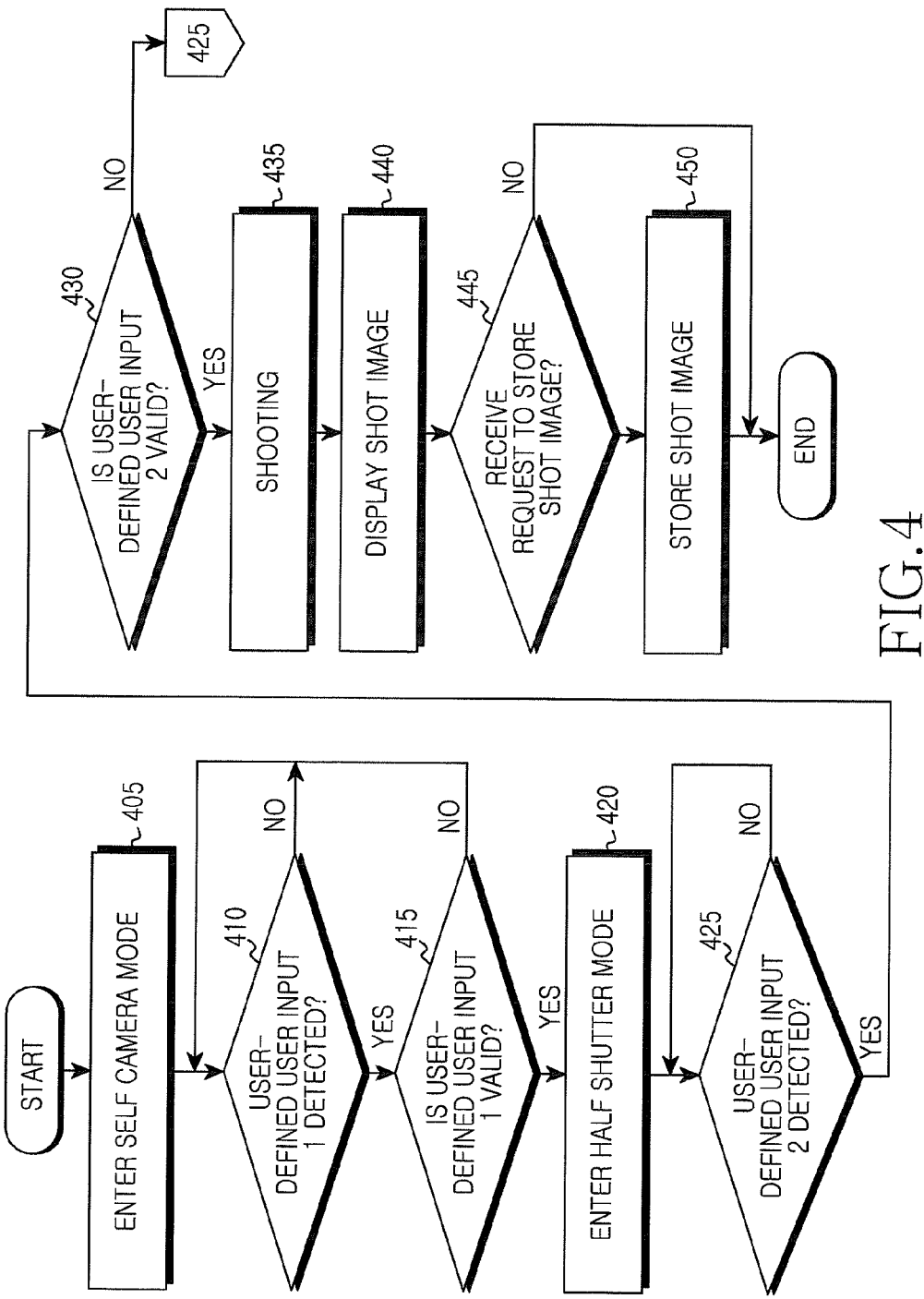
FIG. 4 illustrates a process for allowing a user to perform self-camera shooting conveniently and stably in a mobile terminal according to another exemplary embodiment of the present disclosure.

FIG. 4 illustrates a process for allowing a user to perform self-camera shooting conveniently and stably in a mobile terminal according to another exemplary embodiment of the present disclosure.

Referring to FIG. 4, when the mobile terminal enters a self camera mode (step 405) and then detects a user-defined user input 1 (step 410), the mobile terminal determines whether the user-defined user input 1 is valid (step 415).

Here, the user-defined user input 1 denotes a user input pattern defined by the user. When the user-defined user input 1 is valid (step 415), the mobile terminal enters a half-shutter mode (step 420).

When the user-defined user input 1 is not detected (step 410) and the user-defined user input 1 is not valid (step 415), the mobile terminal determines whether the user-defined user input 1 is detected again (step 410).

After that, when the mobile terminal detects a user-defined user input 2 (step 425), the mobile terminal determines whether the user-defined user input 2 is valid (step 430).

Here, the user-defined user input 2 denotes a user input pattern defined by the user.

An algorithm for determining whether the user-defined user input 1 and the user-defined user input 2 are valid may be the algorithm described with reference to FIG. 3, or a generally used algorithm.

When the user-defined user input 2 is valid (step 430), the mobile terminal performs camera shooting (step 435).

When the user-defined user input 2 is not detected (step 425) and the user-defined user input 2 is not valid (step 430), the mobile terminal determines whether the user-defined user input 2 is detected again (step 425).

After that, the mobile terminal displays a shot image (i.e., an image generated by the mobile terminal) (step 440) and when a request to store the shot image is received from the user (step 445), the mobile terminal stores the shot image (step 450).

Figure 5:
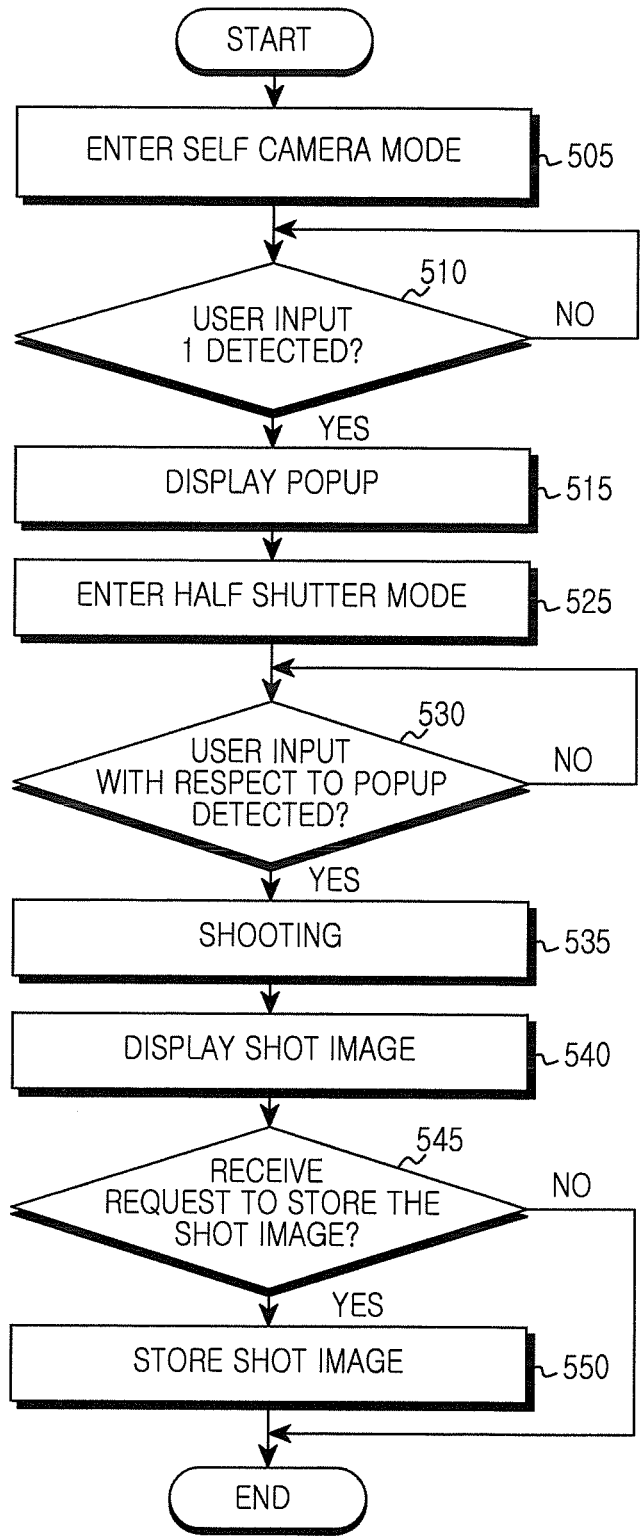
FIG. 5 illustrates a process for allowing a user to perform self-camera shooting conveniently and stably in a mobile terminal according to still another exemplary embodiment of the present disclosure.

FIG. 5 illustrates a process for allowing a user to perform self-camera shooting conveniently and stably in a mobile terminal according to still another exemplary embodiment of the present disclosure.

Referring to FIG. 5, when the mobile terminal enters a self camera mode (step 505) and then detects a user input 1 on a screen (step 510), the mobile terminal displays a popup (step 515). Here, a position at which the popup is output is a position at which the user has provided the user input on the screen.

After that, the mobile terminal enters a half shutter mode (step 525).

After that, when detecting a user input with respect to the popup (step 530), the mobile terminal performs camera shooting (step 535).

When not detecting the user input with respect to the popup (step 530), the mobile terminal determines whether a user input with respect to the popup is detected again.

After that, the mobile terminal displays a shot image (i.e., an image generated by the mobile terminal) (step 540), and a request to store the shot image is received from the user (step 545), the mobile terminal stores the shot image (step 550).

Figure 6:
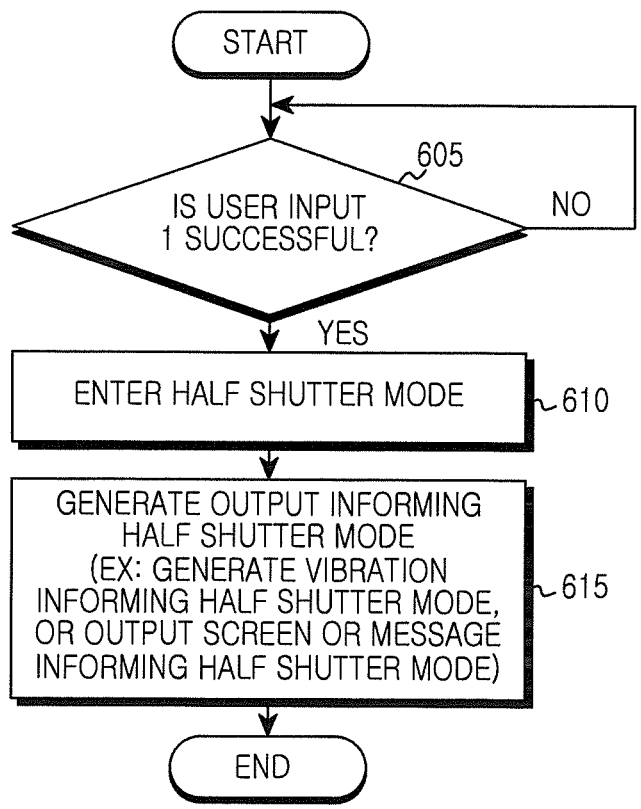
FIG. 6 illustrating a process for outputting a half shutter state according to an exemplary embodiment of the present disclosure.

FIG. 6 illustrates a process for outputting a half shutter state according to an exemplary embodiment of the present disclosure.

Referring to FIG. 6, when successfully detecting the user input 1, the mobile terminal enters a half shutter mode. In this example, when the mobile terminal informs the user who uses the mobile terminal that the mobile terminal enters the half shutter mode, more convenience may be provided to the user.

When successfully detecting, the user input 1 (step 605), the mobile terminal enters the half shutter mode (step 610) and generates a half shutter state output informing that the mobile terminal enters the half shutter mode (step 615).

The half shutter state output may be an output of voice or sounds informing the half shutter mode, generation of vibration informing the half shutter mode, and an output of a screen or a message informing, the half shutter mode.

In addition, the output of the half shutter state may be a blinking output of a Light Emitting Diode (LED) provided to the mobile terminal, or a blinking output of a flash provided to the mobile terminal and there is no limitation in the output of the half shutter state.

Figure 7:
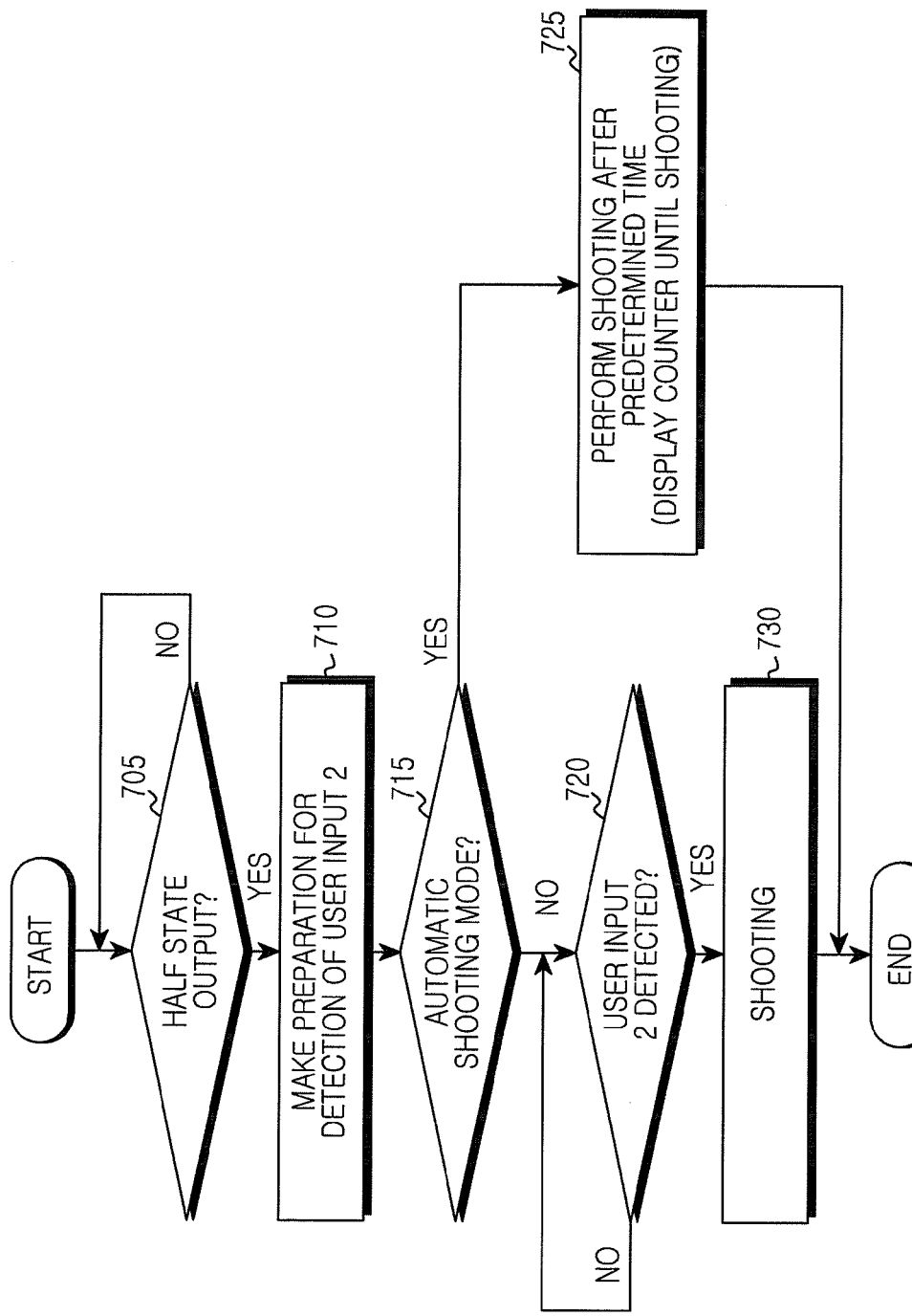
FIG. 7 illustrating a process for shooting via detection of a second user input after a half shutter according to an exemplary embodiment of the present disclosure.

FIG. 7 illustrates a process for shooting via detection of a user input 2 after a half shutter according to an exemplary embodiment of the present disclosure.

Referring to FIG. 7, after outputting the half shutter state (step 705), the mobile terminal makes a preparation for detection of the user input 2 (step 710). The preparation for the detection of the user input 2 denotes determining whether a process for detecting, the user input 2 is set to an automatic shooting mode.

When the automatic shooting mode is set (step 715), the mobile terminal automatically performs camera shooting after a predetermined time (step 725). In this example, a counter time remaining until shooting may be displayed.

When the automatic shooting mode is not set (step 715), the mobile terminal determines whether the user input 2 is detected (step 720).

When detecting the user input 2 (step 720), the mobile terminal performs camera shooting (step 730).

The processes after this are the same as the above-described processes (ex: shot image store).

When detecting the user input 2, instead of the user's operation of providing the user input on the screen of the mobile terminal, the mobile terminal determines whether predetermined specific voice or sounds are detected, and when the specific voice or sounds are detected, the mobile terminal may determine that the user input 2 has been detected.

In addition, when detecting the user input 2, the mobile terminal determines whether the user's specific gesture is input, and when the specific gesture is detected, the mobile terminal may determine that the user input 2 has been detected.

Figure 8:
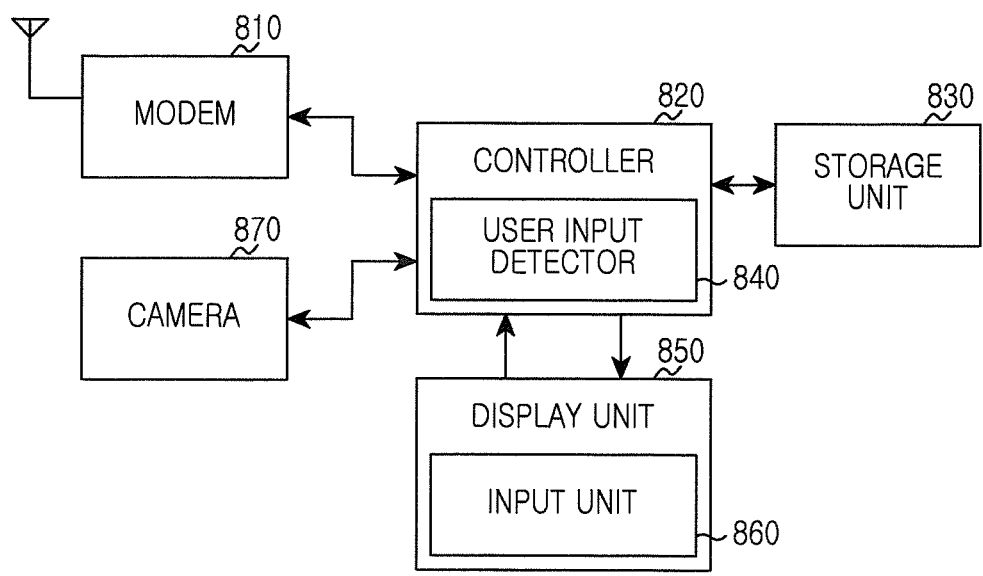
FIG. 8 illustrates a block diagram a mobile terminal allowing a user to perform self-camera shooting conveniently and stably according to an exemplary embodiment of the present disclosure.

FIG. 8 illustrates a mobile terminal allowing a user to perform self-camera shooting conveniently and stably according to an exemplary embodiment of the present disclosure.

Referring to FIG. 8, the mobile terminal includes a modem 810, a controller 820, a storage unit 830, a user input detector 840, a display unit 850, an input unit 860, and a camera 870. The controller 820 controls the user input detector 840. In addition, the user input detector 840 performs shooting and self-camera shooting using the camera 870.

The modem 810 serves as a module for communicating with other apparatuses, and includes a radio processor, a baseband processor, etc. The radio processor converts a signal received via an antenna into a baseband signal to provide the same to the baseband processor, and converts a baseband signal from the baseband processor into a Radio Frequency (RF) signal so that the signal may be transmitted on an actual RF path, to transmit the same via the antenna.

All types of RF communication protocols currently in use may be used as an RF communication protocol used by the modem.

The controller 820 controls an overall operation of the mobile terminal, and more particularly, controls the user input detector 840 according to the present disclosure.

The storage unit 830 stores a program for controlling an overall operation of the mobile terminal and temporary data generated during execution of the program. Particularly, the storage unit 830 stores a shot or generated image according to an exemplary embodiment of the present disclosure.

The display unit 850 displays an output of the controller 820, and may be a Liquid Crystal Display (LCD), for example.

The input unit 860 serves as a unit for obtaining a user input, and is positioned on the display unit 850, and provides the user input to the controller 820.

When the mobile terminal enters a self camera mode and then detects the user input 1, the user input detector 840 determines whether the user input 1 is valid.

A step of determining whether the user input 1 is valid may denote determining whether the position (ex: x, y coordinates) of a user input and the length of the user input in FIG. 1A are between an upper threshold and a lower threshold, and determining whether the standby time in FIG. 1B is between an upper threshold and a lower threshold. The upper threshold and the lower threshold may be set by the user in advance or may be a predetermined value.

When the user input 1 is valid, the user input detector 840 enters a half shutter mode.

When the user input 1 is not detected and the user input 1 is not valid, the user input detector 840 determines whether the user input 1 is detected again.

After that, when detecting the user input 2, the user input detector 840 determines whether the user input 2 is valid. A step of determining whether the user input 2 is valid may denote determining whether the position (x, y coordinates) of a user input and the length of the user input in FIG. 1C are between an upper threshold and a lower threshold. Likewise, the upper threshold and the lower threshold may be set by the user in advance or may be a predetermined value. When the user input 2 is valid, the user input detector 840 performs camera shooting.

When the user input 2 is not detected and the user input 2 is not valid, the user input detector 840 determines whether the user input 2 is detected again.

After that, the user input detector 840 displays a shot image on the display unit 850, and when shot image store is selected by the user, the user input detector 840 stores the shot image in the storage unit 830.

After the mobile terminal enters a self-camera mode, when detecting the user-defined user input 1, the user input detector 840 determines whether the user-defined user input 1 is valid. Here, the user-defined user input 1 is a user input pattern defined by the user. The position, the length, and the time of the user-defined user input 1, and the upper threshold and the lower threshold may be arbitrarily set by the user.

When the user-defined user input 1 is valid, the user input detector 840 enters a half shutter mode.

When the user-defined user input 1 is not detected and the user-defined user input 1 is not valid, the user input detector 840 determines whether the user-defined user input 1 is detected again.

After that, when detecting a user-defined user input 2, the user input detector 840 determines whether the user-defined user input 2 is valid. Here, the user-defined user input 2 is a user input pattern defined by the user. The position, and the length of the user-defined user input 2, and the upper threshold and the lower threshold may be arbitrarily set by the user.

When the user-defined user input 2 is valid, the user input detector 840 performs camera shooting.

When the user-defined user input 2 is not detected and the user-defined user input 2 is not valid, the user input detector 840 determines whether the user-defined user input 2 is detected again.

After that, the user input detector 840 displays a shot image on the display unit 850, and when shot image store is selected by the user, the user input detector 840 stores the shot image in the storage unit 830.

Alternatively, after the mobile terminal enters the self-camera mode, when the user input detector 840 detects a user input on the screen, the user input detector 840 displays a popup. Here, a position at which the popup is output is a position at which the user has provided the user input on the screen.

After that, the user input detector 840 enters a half shutter mode (step 525).

After that, when detecting a user input with respect to the popup, the user input detector 840 performs camera shooting.

When not detecting the user input with respect to the popup, the user input detector 840 determines whether the user input with respect to the popup is detected again.

After that, the mobile terminal displays a shot image on the display 850, and when shot image store is selected by the user, the mobile terminal stores the shot image in the storage unit 830.

When successfully detecting the user input 1, the user input detector 840 enters a half shutter mode. In this example, when the user input detector 840 informs the user who uses the mobile terminal that the user input detector 840 enters the half shutter mode, more convenience may be provided to the user.

That is, when successfully detecting the user input 1, the user input detector 840 enters a half shutter mode, and generates a half shutter state output informing that the user input detector 840 enters the half shutter mode.

The half shutter state output may be an output of voice or sounds informing the half shutter mode, generation of vibration informing the half shutter mode, and an output of a screen or a message informing the half shutter mode.

In addition, the output of the half shutter state may be a blinking output of a Light Emitting Diode (LED) provided to the mobile terminal, or a blinking output of a flash provided to the mobile terminal and there is no limitation in the output of the half shutter state.

After outputting a half shutter state, the user input detector 840 makes a preparation for detection of a user input 2. The preparation for the detection of the user input 2 denotes determining whether a process for detecting the user input 2 is set to an automatic shooting mode.

When the automatic shooting mode is set, the user input detector 840 automatically performs camera shooting after a predetermined time. In this example, a counter time remaining until shooting may be displayed.

When the automatic shooting mode is not set, the user input detector 840 determines whether the user input 2 is detected.

When detecting the user input 2, the user input detector 840 performs camera shooting.

The processes after this are the same as the above-described processes (ex: shot image store).

When detecting the user input 2, instead of the user's operation of providing the user input on the screen of the mobile terminal, the user input detector 840 determines whether specific voice said by the user or sounds are detected using an algorithm realized in advance, and when the specific voice or sounds are detected, the user input detector 840 may determine that the user input 2 has been detected.

In addition, when detecting the user input 2, the mobile terminal determines whether the user's specific gesture is input, and when the specific gesture is detected, the mobile terminal may determine that the user input 2 has been detected.

The present disclosure allows a user to perform camera shooting with a stable operation, thereby providing a convenience to the user.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for taking a self-portrait picture of a user in a portable device equipped with a camera and a display screen, the method comprising:
    displaying a live preview image as a self-portrait image on the display screen, the preview image received from the camera;
    in response to detecting a first user input for triggering a display of an indicator on the display screen, displaying the indicator on the display screen at a position where the first user input is detected;
    in response to detecting a. second user input for triggering a time counter configured to have cause the camera to take the self-portrait picture upon an expiration of the time counter, with respect to the indicator, displaying the time counter indicating a remaining time until taking the self-portrait picture of the user, on the display screen; and
    taking the self-portrait picture of the user through the camera when the time counter expires,
    wherein the first user input for triggering the display of the indicator is detectable at any one of a plurality of detectable positions.

2. The method of claim 1, wherein the first user input matches a preconfigured pattern.

3. The method of claim 2, further comprising:
    in response to receiving the first user input matching the preconfigured pattern, entering a half-shutter mode.

4. The method of claim 1, wherein the second user input matches a preconfigured pattern.

5. The method of claim 1, wherein the first user input is determined to be valid when a position of the first user input is within a predetermined range on the display screen.

6. The method of claim 1, wherein the second user input is determined to be valid when a position of the second user input is within a predetermined range on the display screen.

7. The method of claim 1, wherein the first user input is a touchless input.

8. The apparatus of claim 1, wherein the indicator indicates a region in which the second user input for triggering the time counter is determined to be valid.

9. The method of claim 1, wherein the first user input is determined to be invalid if the first user input does not satisfy a predefined condition, and no indicator is displayed on the display screen if the first user input is determined to be invalid.

10. The method of claim 1, wherein the second user input for triggering the time counter is detectable only while the indicator is displayed on the display screen.

11. A method for self-camera shooting in a mobile terminal, the method comprising:
    determining whether a first input is detected, the first input comprising a first touch on a screen in a first time range;
    in response to detecting the first input, outputting a popup target and entering a half shutter mode;
    determining whether a second input associated with the popup target is detected, the second input comprising a second touch on the screen in a second time range; and
    in response to detecting the second input associated with the popup target, performing the self-camera shooting.

12. The method of claim 11, wherein outputting the popup target comprises outputting the popup target at a position where the first user input has been detected.

13. The method of claim 11, wherein entering the half shutter mode comprises generating an output indicating the half shutter mode.

14. The method of claim 11, further comprising:
    before outputting the popup target, determining whether the first input is valid.

15. An apparatus for taking a self-portrait picture of a user, the apparatus comprising:
    a display screen configured to display an image;
    a camera configured to capture an image; and
    a controller configured to:
        cause the display screen to display a live preview image as a self-portrait image, the preview image received from the camera;
        in response to detecting a first user input for triggering a display of an indicator on the display screen, display the indicator on the display screen at a position where the first user input is detected;
        in response to detecting a second user input for triggering a time counter configured to cause the camera to take the self-portrait picture upon an expiration of the time counter, with respect to the indicator, cause the display screen to display the time counter indicating a remaining time taking the self-portrait picture of the user; and
        take the self-portrait picture of the user through the camera when the time counter expires,
    wherein the first user input for triggering the display of the indicator is detectable at any one of a plurality of detectable positions.

16. The apparatus of claim 15, wherein the first user input matches a preconfigured pattern.

17. The apparatus of claim 16, wherein in response to receiving the first user input matching the preconfigured pattern, the controller is configured to enter a half-shutter mode.

18. The apparatus of claim 15, wherein the second user input matches a preconfigured pattern.

19. The apparatus of claim 15, wherein the first user input is determined to be valid when a position of the first user input is within a predetermined region on the display screen.

20. The apparatus of claim 15, wherein the second user input is determined to be valid when a position of the second user input is within a predetermined region on the display screen.

21. The apparatus of claim 15, wherein the first user input is a touchless input.

22. The apparatus of claim 15, wherein the indicator indicates a range in which the second user input for triggering the time counter is valid to be entered.

23. The apparatus of claim 15, wherein the first user input is determined to be invalid if the first user input does not satisfy a predefined condition, and no indicator is displayed on the display screen if the first user input is determined to be invalid.

24. The apparatus of claim 15, wherein the second user input for triggering the time counter is detectable only while the indicator is displayed on the display screen.

25. An apparatus of bile terminal configured to perform self-camera shooting, the apparatus comprising:
 a camera;
 an input unit configured to detect an input; and
 a controller configured to:
  determine whether a first input is detected, the first input comprising first touch on a screen in a first time range;
  in response to detecting the first input, output a popup target and enter a half shutter mode;
  determine whether a second input is detected with respect to the popup target, the second input comprising a second touch on the screen in a second time range; and
  in response to detecting the second input with respect to the popup target, perform the self-camera shooting.

26. The apparatus of claim 25, wherein the controller is configured to output the popup target at a position where the user input with respect to the popup target has been detected when outputting the popup target.

27. The apparatus of claim 25, wherein the controller is configured to generate an output indicating the half shutter mode when entering the half shutter mode.

28. The apparatus of claim 25, wherein before outputting the popup target, the controller is configured to determine whether the first input is valid.

* * * * *

UNITED STATES PATENT AND TRADEMARK OFFICE
CERTIFICATE OF CORRECTION

| | |
|---|---|
| PATENT NO. | : 9,041,847 B2 |
| APPLICATION NO. | : 13/678350 |
| DATED | : May 26, 2015 |
| INVENTOR(S) | : Ju-Hyoung Son and Soon-Mi Cho |

It is certified that error appears in the above-identified patent and that said Letters Patent is hereby corrected as shown below:

In the Claims

In Column 9 line 43, delete the phrase "detecting a. second" and insert -- "detecting a second" --

In Column 9 line 44, delete the phrase "configured to have cause" and insert -- "configured to cause" --

Signed and Sealed this
Tenth Day of November, 2015

Michelle K. Lee
*Director of the United States Patent and Trademark Office*